US011568338B2

(12) United States Patent
Choi

(10) Patent No.: US 11,568,338 B2
(45) Date of Patent: Jan. 31, 2023

(54) TASK MAP PROVIDING APPARATUS AND METHOD THEREOF

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

( * ) Notice: Subject to any disclaimer, the term of this patent is extended or adjusted under 35 U.S.C. 154(b) by 82 days.

(21) Appl. No.: 16/745,958

(22) Filed: Jan. 17, 2020

(65) Prior Publication Data
US 2020/0380449 A1    Dec. 3, 2020

(30) Foreign Application Priority Data
May 30, 2019  (KR) .......................... 10-2019-0064009

(51) Int. Cl.
*G06Q 10/06*    (2012.01)
*G06N 5/04*    (2006.01)

(52) U.S. Cl.
CPC ....... *G06Q 10/063114* (2013.01); *G06N 5/04* (2013.01)

(58) Field of Classification Search
CPC .............. G06Q 10/1097; G06Q 10/06; G06Q 10/063114; G06N 5/04
USPC ...................................................... 705/7.15
See application file for complete search history.

(56) References Cited

U.S. PATENT DOCUMENTS

| 2004/0017400 | A1* | 1/2004 | Ly ................... | G06Q 10/06 715/810 |
| 2007/0073575 | A1* | 3/2007 | Yomogida .............. | G06Q 10/06 705/7.15 |
| 2007/0288283 | A1* | 12/2007 | Fitzpatrick ............. | G06Q 10/06 705/7.17 |
| 2014/0006972 | A1* | 1/2014 | Celkonas ............. | G06Q 10/101 715/753 |

(Continued)

FOREIGN PATENT DOCUMENTS

| KR | 10-2002-0045006 A | 6/2002 |
| KR | 10-1739794 B1 | 5/2017 |
| KR | 10-1934338 B1 | 3/2019 |

OTHER PUBLICATIONS

Calendar Help: Designing a workflow-based scheduling agent; (Cranshaw et al.). (Year: 2017).*

(Continued)

*Primary Examiner* — Timothy Padot
*Assistant Examiner* — Francis Z. Santiago Merced
(74) *Attorney, Agent, or Firm* — Paratus Law Group, PLLC

(57) ABSTRACT

Disclosed is a task map providing apparatus for displaying one or more tasks, the apparatus including a memory and a processor electrically connected with the memory. The processor may be configured to generate the one or more tasks by receiving, from a task instructor who instructs recording a note through the one or more tasks, information on a task performer instructed to record the note corresponding to the one or more asks, generate progressive bars to correspond the one or more tasks, the progressive bar representing how many days have passed and remain with respect to a note recording due date by which the task performer needs to record the note.

17 Claims, 10 Drawing Sheets

(56) References Cited

U.S. PATENT DOCUMENTS

| | | | |
|---|---|---|---|
| 2014/0280136 A1* | 9/2014 | Marshall | G06Q 10/0637 |
| | | | 707/736 |
| 2016/0012368 A1* | 1/2016 | O'Connell | G06Q 10/06316 |
| | | | 705/7.26 |
| 2016/0180298 A1* | 6/2016 | McClement | G06F 3/04842 |
| | | | 705/7.21 |
| 2017/0206501 A1* | 7/2017 | Wang | G06Q 10/103 |
| 2017/0316367 A1* | 11/2017 | Candito | G06Q 10/063114 |
| 2018/0034879 A1* | 2/2018 | Chegini | G06Q 50/08 |
| 2019/0034494 A1* | 1/2019 | Bradley | G06Q 10/0637 |

OTHER PUBLICATIONS

Korean Office Action for related KR Application No. 10-2019-0064009 dated Sep. 27, 2020 from Korean Intellectual Property Office.

* cited by examiner

- Task name: Task X
  - Note Recording Round: 5th
  - Note Recording Period: 2 weeks
  - Current Note Recording Due Date: March 2, 2019
    (Impending)
  - Number of Accumulated Notes: 8
  - Latest Note Recording Date: April 13, 2019

- Latest Note Content: Regarding seismic design
    (...omitted)

1000

1005

TASK MAP PROVIDING APPARATUS AND METHOD THEREOF

CROSS-REFERENCE TO RELATED APPLICATION

This application claims priority to and the benefit of Korean Patent Application No. 10-2019-0064009 filed on May 30, 2019, which is hereby incorporate by reference in its entirety.

BACKGROUND

The present disclosure relates to a work management technology and more particularly to a technology for providing a work progress informing tool by providing a task map in a manner in which visual information for multiple tasks required for one task is provided on one screen so that arrival of due dates may be notified and schedule management may be possible.

An existing task management program has provided a function of displaying a list of entire tasks to improve task management efficiency. In addition, a technology of transmitting a reminder upon due date setting has been already used. This is to set a due date of a specific task and provide a reminding messages to a user based on the due date. However, when providing the reminder, the existing technology does not reflect a situation of a recipient, which may change in real time, or a progress status of a task. In particular, there is a drawback that the overall progress status of multiple tasks occurring simultaneously cannot be provided in an intuitive way.

SUMMARY

The present disclosure provides a technology for providing a task performer with a reminder regarding multiple tasks occurring simultaneously to manage work schedule, as planned. In addition, another aspect provides a technology for visualize recording of a note in the form of a progressive bar over time, so that a task performer and a task instructor or manager are all allowed to intuitively figure out the work progress. In addition, yet another aspect provides a user interface in which a status of a task or a progressive bar is changed in real time according to a degree of arrival of a due date so as to allow a task performer to easily figure how which task is urgent, and in which progress of subordinate tasks for multiple tasks are visualized in real time, so that not just a task instructor or manager but also the task performer are allowed to easily figure out the work current statuses.

In an aspect, there is provided a task map providing apparatus for displaying one or more tasks, the apparatus including a memory and a processor electrically connected with the memory. The processor may be configured to generate the one or more tasks by receiving, from a task instructor who instructs recording a note through the one or more tasks, information on a task performer instructed to record the note corresponding to the one or more asks, generate progressive bars to correspond the one or more tasks, the progressive bar representing how many days have passed and remain with respect to a note recording due date by which the task performer needs to record the note, and, when an access by a user terminal is detected, generate a task map including the one or more tasks, that the user terminal has authority to access. The task map may include one or more task cells corresponding to the one or more tasks, respectively, and the progressive bars corresponding to the one or more tasks are displayed in the respective task cells in the task map.

In another aspect, there is provided a task map providing apparatus for displaying one or more tasks, the apparatus including a memory and a processor electrically connected with the memory. The processor may be further configured to generate the one or more tasks by receiving, from a task instructor who instructs to record notes through the one or more tasks, information regarding a task performer instructed to record the note for the one or more tasks, generate progressive bars to correspond to the respective one or more tasks, the progressive bars each representing how many days have passed and remain with respect to a note recording due date, by which the task performer needs to record the notes, and when an access by a user terminal is detected, generate a task map including the one or more tasks and one or more task cells corresponding to the respective one or more tasks, the one or more tasks which the user terminal has authority to access. The task map may include the one or more task cells corresponding to the one or more tasks, respectively, and the progressive bars corresponding to the one or more tasks are displayed in the respective task cells in the task map.

In yet another aspect, there is provided a recording medium for storing a computer program regarding a task map providing method capable of being implemented in a computer, the recording medium comprising functions to generate one or more tasks by receiving, from a task instructor who instructs to record notes through the one or more tasks, information regarding a task performer instructed to record the note for the one or more tasks, generate progressive bars to correspond to the respective one or more tasks, the progressive bars each representing how many days have passed and remain with respect to a note recording due date, by which the task performer needs to record the notes, and, when an access by a user terminal is detected, generate a task map including the one or more tasks and one or more task cells corresponding to the respective one or more tasks, the one or more task tasks which the user terminal has authority to access. The task map may include the one or more task cells corresponding to the one or more tasks, respectively, and the progressive bars corresponding to the one or more tasks are displayed in the respective task cells in the task map.

DETAILED DESCRIPTION

Figure 1:
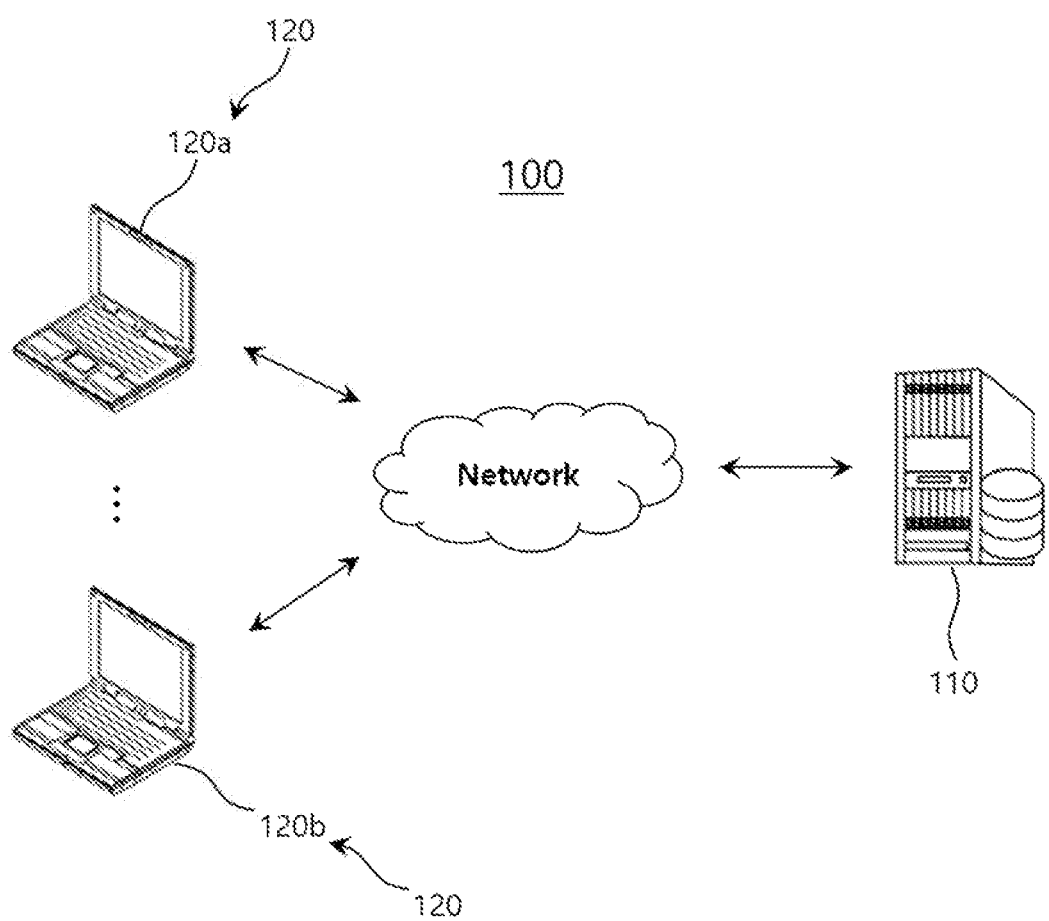
FIG. 1 is a diagram illustrating a task map providing system according to an embodiment of the present disclosure.

The scope of the present invention is not limited to the disclosed embodiments. That is, since embodiments of the invention can be variously changed and have various forms, the scope of the present invention should be understood to include equivalents capable of realizing the technical spirit. Further, it should be understood that since a specific embodiment should include all objects or effects or include only the effect, the scope of the present invention is limited by the object or effect.

Meanwhile, meanings of terms described in the present application should be understood as follows.

The terms "first," "second,", and the like are used to differentiate a certain component from other components, but the scope of should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted.

It is to be understood that the singular expression encompass a plurality of expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

The present disclosure can be implemented as a computer-readable code on a computer-readable recording medium and the computer-readable recording medium includes all types of recording devices for storing data that can be read by a computer system. Examples of the computer readable recording medium include a ROM, a RAM, a CD-ROM, a magnetic tape, a floppy disk, an optical data storage device, and the like and further include a device implemented as a type of a carrier wave (e.g., transmission through the Internet). Further, the computer readable recording media may be stored and executed as codes which may be distributed in the computer system connected through a network and read by a computer in a distribution method.

If it is not contrarily defined, all terms used herein have the same meanings as those generally understood by those skilled in the art. Terms which are defined in a generally used dictionary are interpreted to have the same meaning as the meaning in the context of the related art, and are not interpreted as an ideal meaning or excessively formal meanings unless clearly defined in the present application.

FIG. 1 is a diagram illustrating a task map providing system 100 according to an embodiment of the present disclosure.

Referring to FIG. 1, the task map providing system 100 may include a task map providing apparatus 110 and one or more user terminals 120.

The task map providing apparatus 110 may correspond to a computing device capable of being connected with at least one user terminal 120 via a network. In some implementations, the task map providing apparatus 110 may manage one member group in which a user associated with the user terminal 120 is included as a member.

In some implementations, the task map providing apparatus 110 may be connected with the user terminal 120 through a shared folder agent installed in the user terminal 120. The shared folder agent may correspond to a software agent program capable of allowing the user terminal 120 and the task map providing apparatus 110 to cooperate with each other under approval by the user terminal 120 once the software agent program is installed in the user terminal 120.

The user terminal 120 may correspond to a computing device capable of being connected with the task map providing apparatus 110 via a network. The user terminal 120 may be, for example, a user terminal implemented in the form of a desktop, a laptop PC, a tablet PC, a smart phone, or the like.

The user terminal 120 may be provided in one or more in number. In this case, the user terminal 120 may include any one of a first user terminal 120*a*, a second user terminal 120*b*, and a third user terminal (not shown) or at least one thereof. For convenience of explanation, a user terminal 120 used by a first user may be referred to as the first user terminal 120*a*, a mobile terminal 120 used by a second user may be referred to as the second user terminal 120*b*, and a user terminal 120 used by a third user may be referred to as the third user terminal (not shown).

For example, the first user terminal 120*a* may be a mobile terminal and may be connected with the task map providing apparatus 110 through cellular communication or Wi-Fi communication. In another example, the second user terminal 120*b* may be a desktop PC and may be connected with the task map providing apparatus 110 via the Internet. Here, the first user and the second user respectively corresponding to the first user terminal 120*a* and the second user terminal 120*b* may be participants commonly accessing the task map providing apparatus 110 to instruct or perform tasks. In addition, in this course, if a file is shared in a shared folder, the users may share the shared folder and the shared file.

Figure 2:
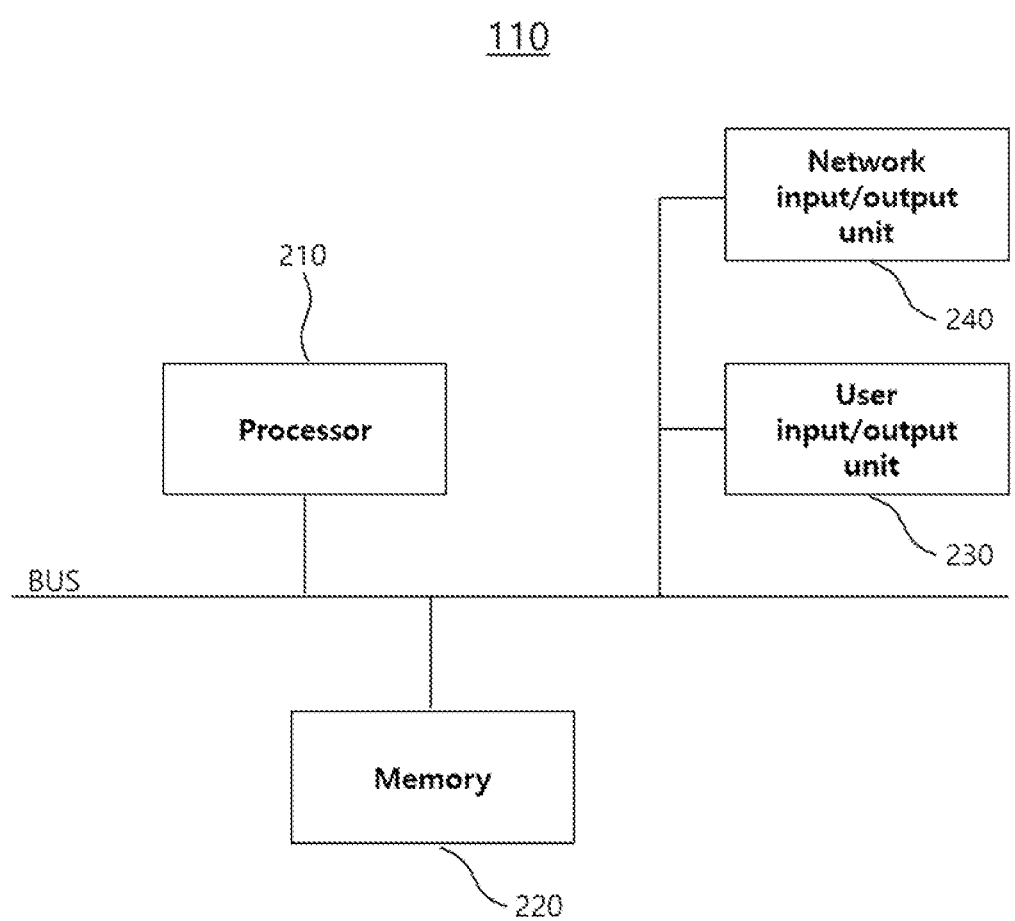
FIG. 2 is a block diagram of the task map providing apparatus according to an embodiment of the present disclosure.

FIG. 2 is a block diagram of the task map providing apparatus 110 according to an embodiment of the present disclosure.

Referring to FIG. 2, the task map providing apparatus 110 may include a processor 210, a memory 220, a user input/output unit 230, and a network input/output part 240.

The processor 210 may execute a reminder providing procedure according to an embodiment of the present disclosure. The processor 210 may manage the memory 220 read or written in the course of executing the reminder providing procedure. The processor 210 may schedule when to synchronize a volatile memory and a non-volatile memory in the memory 220.

The processor 210 may control overall operations of the task map providing apparatus 110. The processor 210 may be electrically connected with the memory 220, the user input/output unit 230, and the network input/output unit 240 to control a data flow therebetween. The processor 210 may be implemented in the form of a Central Processing Unit (CPU) of the task map providing apparatus 110. Specific operations of the processor 210 will be described in more detail with reference to FIG. 3.

The memory 220 may be implemented in the form of a non-volatile memory such as a Solid State Disk (SSD) or a Hard Disk Drive (HDD). The memory 220 may include an auxiliary memory used to store overall data necessary for the task map providing apparatus 110 and may include a main memory implemented in the form of a volatile memory, such as a Random Access Memory (RAM). As such, the memory 220 may be implemented in the form of a volatile memory and a non-volatile memory. If the memory 220 is implemented in the form of a non-volatile memory, the memory 220 may be connected via a hyperlink.

The user input/output unit 230 may include an environment for receiving or input various user signals and an environment for outputting a specific signal or information. For example, the user input/output unit 230 may include an input device including an adapter, such as a mouse, a trackball, a touch pad, a graphic tablet, a scanner, a touch screen, a keyboard, and a pointing device, and may include an output device including an adapter, such as a monitor and a touch screen. In some implementations, the user input/output unit 230 may correspond to a computing device being accessed through a remote access, and, in this case, the task map providing apparatus 110 may serve as a server.

The network input/output unit 240 may include an environment for connecting the user terminal 120 via a network. For example, the network input/output unit 240 may include an adapter for Local Area Network *LAN."

Figure 3:
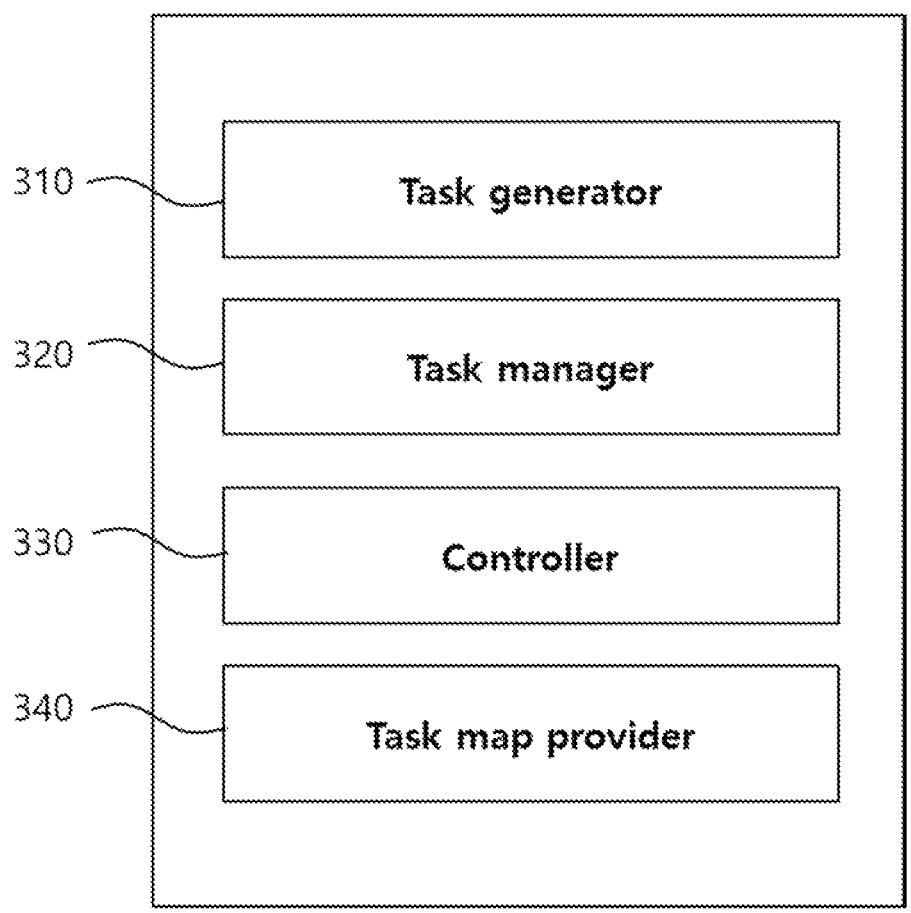
FIG. 3 is a block diagram illustrating a processor in a task map providing apparatus according to an embodiment of the present disclosure.

FIG. 3 is a block diagram of the processor 210 of the task map providing apparatus 110 according to an embodiment of the present disclosure.

The processor 210 of the task map providing apparatus 110 according to an embodiment of the present disclosure may include a task generator 310, a task manager 320, a controller 330, and a task map provider 340. However, the processor 210 according to an embodiment of the present disclosure does not necessarily include all of the aforementioned elements. According to an embodiment, some of the aforementioned elements may be omitted and some or all of the aforementioned elements may be selectively included.

According to an embodiment of the present disclosure, individual works to be instructed or performed by a user may be referred to as tasks. A task is generated by a task constructor. When the task constructor inputs task information including one or more of a task name, a classification of the task, a task performer, and the task constructor and request generation of the task, the task may be generated. Multiple tasks may be included in one higher project, and there may be a task to be performed independently regardless of a project. Here, a user instructing performance of a task may be referred to as a task instructor, and a user performing a task may be referred to as a task performer.

Performing a task may include recording a note regarding the task. The note may be a text input by a task performer about a proceeding status or details of the task, a file object, a file link, and the like. The note may be repeatedly or periodically input until the corresponding task is terminated.

In particular, a note periodically recorded with regard to a corresponding task until termination of the task may be referred to as a periodic note. When it is required to periodically input a note to be recorded to correspond to a task, a period in which the note is to be recorded may be referred to as a note recording period. For example, when a task instructor or a task constructor sets a particular task such that a note regarding the particular task is to be recorded every two weeks, a task performer needs to input a periodic note regarding processing or proceeding of the corresponding task once in two weeks. In this case, a period for recoding a periodic note is two weeks.

The task performer needs to input multiple notes with regard to one task, and the notes may be recorded periodically, as described above. Here, a progressive bar for each individual note may be generated in the form of a widget that visually shows a progress in time from a starting date to a due date of a note recording time or from the starting date to the due date of the note recording period. The due date of the note recording time or the due date of the note recording period may be referred to as a general term "a note recording due date." States of the progressive bar may be classified into normal, impending, and elapsed according to how the due date is impending.

A signal or message provided by the task map providing apparatus 110 to inform a task performer of arrival of a note recording due date whenever the note recording due date is close according to setting of the note recording period or a task instructor may be referred to as a note recording reminder.

That is, when it is required to record multiple notes for one task, a note recording due date for each of the multiple notes may be automatically set according to setting of a note recording period. Alternatively, in some implementations, a note recording due date for each of the multiple notes may be set individually according to setting by a task instructor. When a note recording due date is set and about to be impending, the task map providing apparatus 110 may generate a note recording reminder to notify arrival of the note recording due date and transmit the note recording reminder to a terminal of a task performer.

For example, in the case where a note recording period is preset and a note recording due date is set according to the note recording period, when a new period for recording a periodic note starts, a note recording reminder is generated as a message for reminding a task performer of the fact that a new periodic note needs to be recorded after a predetermined period of time elapses. Then, the note recording reminder may be sent to a terminal of a task performer. Here, the note recording reminder to notify a note recording due date set by a note recording period for a periodic note may be referred to as a periodic note reminder.

Yet, for a predetermined period of time after a new period starts, a note recording reminder is not sent but suspended, and, a period of time for which the note reminder is suspended after the start of the new period may be referred to as a reminder deferring time.

Depending on whether the note recording reminder is sent or not, a status of the progress bar may change from normal to impending. After the note recording reminder is sent, a displaying manner such as color and brightness of a corresponding task cell on a task map may change.

Principally, the note recording reminder is newly transmitted whenever a note recording due date for the same task is about to arrive, and thus, the note recording period may be repeatedly transmitted to the task performer. In addition, even in the case where inputting of a note continues being suspended in one note recording period despite transmission of the note recording reminder, the note recording reminder may be repeatedly transmitted to the terminal of the task performer until the note is input. Here, the terminal of the task performer may be the first user terminal 120a, and a terminal of the task instructor may be the second user terminal 120b.

The task generator 310 may generate a task in response to a request from the task constructor. In addition, the task generator 310 may receive information necessary to generate a task from a terminal of the task constructor.

The task generator 310 may receive, from the terminal of the task constructor, task instructor information and task performer information of the task to be generated. Alternatively, the task constructor may confirm only the task instructor, and the task performer may be designated by the task instructor. In this case, when the task generator 310 generates a task, the task generator 310 may acquire information regarding the task instructor from the terminal of the task constructor and acquire information regarding the task performer from the terminal of the task instructor.

When receiving a task generating request, the task generator 310 may also receive detailed information of a corresponding task, such as a name of the task, a classification of the task, a starting date and a due date of the task, a note recording due date, a reminder deferring time, and the like. Before the task is generated, the task generator 310 may acquire the detailed information of the task from the terminal of the task constructor together with a task generating request. After the task is generated, the task generator 310 may acquire the detailed information of the task from one or more terminals of the task constructor, the task instructor, and the task performer.

In addition, in the case where a note for the task is required to be periodically input, the task generator 310 may receive even information regarding a note recording period of the corresponding periodic note from the terminal of the task constructor or the task instructor. Input information regarding a task to be generated by the task generator 310 may be stored together with the corresponding task and may be provided when detailed information of the task is provided or may be transmitted to the task manager 320, the controller 330, or the task map provider 340.

The task generator 310 may designate and store the task instructor and the task performer for the corresponding task, according to a user input. The task constructor may be one of the task instructor or the task performer or may be a third user who is neither the task instructor nor the task performer.

The task manager 320 may receive, store, and manage a note recorded by a user with respect to each individual task. In particular, when a periodic note is input with respect to a task of which a note recording period is set, the task manager 320 may store and manage an input timing and a content of the corresponding periodic note and may provide access to the periodic note based on authentication of a user.

The task manager 320 may generate and manage a progressive bar for each individual task. In addition, the task manager 320 may change and manage a status or a displaying manner of a progress bar, a displaying manner of a task, and the like in accordance with a control signal from the controller 330 which will be described below. The progressive bar represents how many days have passed and remain with respect to a note recording due date by which the task performer needs to record a note.

The task manager 320 may receive, from the terminal of the task instructor, information regarding at least one of: a name of a task, a department name of the task performer or a name of a department in charge of the task, and a classification of the task according an instruction indicated through the task. The task manager 320 may store the received information. Such detailed information of the task may be used as first alignment references or second alignment references when generating a task map.

Here, a note may be periodically received from the terminal of the task performer according to a preset period, and, in this case, the period may be referred to as a note recording period. As note recording is completed, the task manager 320 may update a note recording period for a next note to be recorded and a progress bar to correspond to the period.

In this case, according to an embodiment, the progressive bar and the like may be updated for a next period upon elapse of a due date of the current period and arrival of a scheduled starting date of the next period.

According to another embodiment, a next note recording period or a progressive bar is not updated just because of arrival of a period, and the progressive bar may change to a "suspended status" when the note recording due date elapses. In this case, the note recording period and the progressive bar may be updated only when recording a note corresponding to the period is completed.

As the note recording is completed, when the task manager 320 updates a note recording period and a progressive bar for a next note to be recorded, the updated progressive bar may resume in a "normal" status.

When a period for inputting a note is set, the controller 330 may set a note recording period for recording a periodic node and a note recording due date, by which a periodic note needs to be input from the terminal of the task performer in the note recording period, so that the note recording period and the note recording due date corresponds to a user input. The note recording period and the like may be set in accordance with a signal received from the task constructor, for example, when a task is generated, or may be input or modified by the task performer or the task instructor after the task is generated.

That is, the note inputting period for a periodic note may be set by one or more of the task constructor, the task instructor and the task performer. For example, when generating a task is requested, the task constructor or the task performer may select a note recording period for the corresponding task. When a user signal to set a note recording period to "two weeks" is input from the terminal of the task constructor or the terminal of the task performer, the controller 330 may set the note recording period for the corresponding task to two weeks. Then, a point in time two weeks after the start of the note recording period may be set to a note recording due date.

The controller 330 may set a reminder deferring time in which a note recording reminder to notify arrival of the note recording due date is temporarily deferred. When the reminder deferring time elapses, the note recording reminder is sent to the terminal of the task performer. According to an embodiment of the present disclosure, a note for each task is principally to be recorded before a note recording due date after start of a note recording period, as described above. However, there may be some cases where a periodic note is not input when the note recording due date is impending, arrives, or already elapses. In such cases, the task map providing apparatus 110 may provide the note recording reminder to the terminal of the task performer, as described above.

According to an embodiment of the present disclosure, sending the note recording reminder may require conditions: including i) the reminder deferring time has elapsed and ii) a note for the corresponding task has not yet been input.

Likewise to the note recording period, the reminder deferring time regarding sending the note recording reminder may be also received together when the task generator 310 receives information regarding the task from the terminal of the task generator to generate the task, and the controller 330 may set the reminder deferring time accordingly. Alternatively, when any one of the task constructor, the task performer, and the task instructor request a change or a modification after the task is generated, the reminder deferring time may be set again accordingly.

That is, the note recording reminder may not be sent continuously right after the start of the note recording time or the note recording period and may be sent to the terminal of the task performer only when the reminder deferring time has elapsed since the start of the note recording time or the note recording period. That is, the reminder deferring time may be input to a timer that is manage by the controller 330 to send the note recording reminder.

That is, the controller 330 of the task map providing apparatus 110 may drive a timer for each task to manage a note, a note recording reminder, a current stage of a task, and a progressive bar status of each task. Whenever a new note recording period starts and whenever a periodic note is input, the timer may be initialized.

The reminder deferring time, the note recording period, or the note recording due date may be input to the timer. When the reminder deferring time has elapsed in the timer, the controller 330 may send a control signal to the task manager 320 to change the status of the progressive bar from "normal" to "impending" and may send the note recording reminder to the terminal of the task performer. In addition, in accordance with the corresponding control signal, the task manager 320 may change a displaying manner, such as color, brightness, contrast, and the like, of the progressive bar after sending the note recording reminder.

After the note recording reminder is set, the controller 330 may use a control signal so that the task manager 320 changes a color of a corresponding task cell in a task map. In addition, the controller 330 may input a proceeding time of the task into the timer, and use a control signal for a stage change of the task, so that the task manager 320 changes the stage of the task to "terminated" upon termination of the task.

Hereinafter, each stage of a task and each status of a note period progressive bar will be described.

First, a task may correspond to one of four stages including scheduled, proceeding, terminated, and confirmed. The stages of a task may be classified into: a scheduled stage before start of a task start date when the schedule of the corresponding task starts, an ongoing stage between the task start date and a task end date, a terminated stage after the task end date when the schedule of the task is terminated, and a confirmed stage when the task instructor confirms and evaluates a processing result of the task after the task is terminated.

In addition, the task manager 320 and the controller 330 may provide a note period progressive bar that represents a degree of arrival of a note recording due date of each note recording period for an individual task. In particular, when a periodic note for which a note recording period is set is input, the progressive bar may represent a degree of progress of each individual note recording period for an individual task.

In general, the progressive bar is a widget that shows, to a user, a degree of progress of a period or a particular procedure or progress of the procedure. Accordingly, the progressive bar according to an embodiment of the present disclosure visualizes how many days have passed since one note recording time or one note recording period started and how many days remain until a note recording due date.

The task manager 320 and the controller 330 may generate and manage a progressive bar for a note for each individual task and provide the progressive bar to the user terminal 120. The user terminal 120 may display the progressive bar through a display. As described above, the progressive bar is generated and updated upon recording of one note for each individual task, and the starting point and the ending point of the progressive bar may be set to the starting date and the due date of a note recording time or a note recording period.

That is, for example, the progressive bar visualizes the flow of time in units of a note recording period to show how many days have passed at the present time over the entire timeline from a starting date to a due date of a particular note recording period. The progressive bar may show in real time, through a position of a scroll bar, how many days have passed at the present time since the starting time of a corresponding note recording period. The progressive bar may be updated whenever a new note recording period starts.

Herein, the progressive bar may correspond to one status from among "normal", "impending", and "overdue" according to a degree of progress of a corresponding note recording time or a corresponding note recording period, how many days have passed, and how many days remain until a note recording due date. In addition, the progressive bar may be provided in a different display manner according to how many days have passed or whether a note recording reminder has been sent. The different display manner may refer to color, contrast, brightness, highlight, and the like of the progressive bar, as described above.

The progressive bar may be classified into: the normal state which is within a reminder deferring time since the start date of the note recording period, the impending status which lasts between transmission of the note recording reminder upon elapse of the reminder deferring time and a note recording due date, and the overdue status in which the note recording due date has elapsed.

When the progressive bar is in the normal status, the impending status, or the overdue status, the controller 330 may provide a control signal to the task manager 320 so that the progressive bar is displayed in different color in response to each of the status. For example, the task manager 320 and/or the controller 330 may change color of the progressive bar and provide the progressive bar to the user terminal 120, so that the progressive bar in the normal status is displayed in blue, the progressive bar in the impending status is displayed in orange, and the progressive bar in the overdue status is displayed in red.

Accordingly, a user is allowed to intuitively figure out, based on color of the progressive bar, which task with an impending note recording due date, which task with an elapsed note recording due date, and the like. In particular, on a task map where one or more tasks are displayed within one screen, the user is allowed to open a progressive bar for each individual task all at once. If the progressive bar is displayed in different color according to a status thereof, the user may be allowed to more intuitively figure out the entire work progress.

The progressive bar may be provided only when a corresponding task is in "ongoing stage." In this case, the progressive bar is not provided when the corresponding task is in a scheduled stage or in a terminated stage.

In addition, the controller 330 may not just provide a task list, a task map, a note, and a progressive bar for each individual note in the task map providing system 100, but also may manage user access authorization.

When the user terminal 120 accesses or attempt to access the task map providing system 100, the controller 330 may sense the access by the user terminal 120 or receive a notification signal regarding the access by the user terminal. In addition, the controller 330 may acquire user identification information from the user terminal 120. Further, the controller 330 may receive a request from the user terminal 120 to access the task map providing system 100 and may verify access authorization of a corresponding user or the user terminal 120 to determine whether to allow the access by the user terminal 120.

When the access by the user terminal 120 is allowed, the controller 330 may use the user identification information of the user terminal 120 to identify a task which the corresponding user has the authority to access, modify, and the like. In addition, the controller 330 may identify whether the corresponding user is a task instructor, a task constructor, or a task performer in regard to which task.

Accordingly, the controller 330 may reselect only a task and a note which are suitable for the user terminal 120 accessing the task map providing system 100. That is, the controller 330 may reselect only a task and a note regarding which the user terminal 120 has the authority to access or open. The controller 330 may provide the user terminal 120 with a task map or a task list of tasks that are selected according to the authority of the user.

In particular, the controller 330 may verify the authority of the user accessing the task map providing apparatus 110, and provide the task map provider 340 with information on tasks which the corresponding user has the authority to access, information on the authority range of the corresponding user regarding each individual task, and the like.

The task map provider 340 may generate a list of tasks which the user accessing the task map providing apparatus 110 has the authority to access. Particularly, the task map provider 340 may generate the task list in the form of a task map.

The task map may be a user interface which provides tasks aligned according to preset references when there are one or more tasks which a particular user has the authority to access or which is associated with the particular user. The task map includes one or more task cells, and a different task corresponds to each individual task cell. When the task map is provided, the user terminal 120 may display, in one screen, tasks which are associated with the particular user.

One or more tasks in the form of a map may be displayed on a screen. A map in which one or more tasks are aligned on a plane according to predetermined references will be hereinafter referred to as a task map. As described above, a different task may be mapped in each cell on the task map. A name of a task and/or a current progressive bar corresponding to the task map be displayed in each task cell. Even in this case, a progressive bar only for a task currently in the "progressing stage" among all the tasks on the task map may be displayed in a corresponding cell.

The task map may include a first axis and a second axis. Tasks are aligned along the first axis according to first alignment references and along the second axis according to second alignment references. For example, names of departments in charge of tasks may be aligned along the first axis, and classification information of the tasks may be aligned along the second axis. In this case, the tasks are aligned along the first axis according to department names and along the second axis according to task classification information. In this case, the first alignment references may be the department names, and the second alignment references may be the task classification information.

The task classification information may be, for example, information into which specific details corresponding to a task such as meeting minutes, competitor information management, a work plan, a performance result, a proposal for improvement, and the like are classified by predetermined references. In addition, a department name may be a name of a department to which a task performer belongs or a name of a department which deals with or is responsible for the corresponding task. According to an embodiment of the present disclosure, items corresponding to department names may be aligned along the first axis on the task map, and items corresponding to task classification information may be aligned along the second axis. In this case, tasks may be aligned along the first axis according to the department names and along the second axis according to the task classification information.

The task classification information and the department names are merely examples of the first alignment references and the second alignment references, and the first alignment references and the second alignment references are not limited to the task classification information and the department names. One or more items from among information input as detailed information for tasks may be used as the first alignment references and/or the second alignment references. In addition, the first alignment references and the second alignment references for the task map may be set by a user's selection.

Accordingly, the task map provider 340 may display, on a plane including the first axis and the second axis, a task map including one or more cells corresponding to respective tasks. The corresponding tasks may be aligned on one plane according to the first alignment references and the second alignment references and provided to the user terminal 120.

According to an embodiment of the present disclosure, a progressive bar for each individual task may be displayed in a task cell in a task map. When tasks are aligned according to the first alignment references and the second alignment references, task cells corresponding to the tasks may be displayed on the task map. The progressive bar may be updated in real time according to a note recording status, elapse of a period, transmission of a note recording reminder, and the like.

As a result, progressive bars for respective tasks aligned according to the first alignment references and the second alignment references may be displayed on the task map provided by the task map provider 340. Accordingly, a task corresponding to both a first alignment reference a and a second alignment reference b or a progressive bar for the corresponding task may be displayed at a task cell positioned at intersection between the first alignment reference a and the second alignment reference b.

The task map providing apparatus 110 may receive a task inquiry request signal from the user terminal 120 through the user input/output unit 230 or the network input/output unit 240. The task inquiry request signal is a user signal to request an inquiry of a list of tasks corresponding to a specific condition or to inquire detailed information of a task. Accordingly, the task inquiry request signal may be a signal to access detailed information for one task or may be a user signal to inquire all tasks corresponds to alignment references selected by a user.

When a task inquiry request signal to request an inquiry of one or more tasks meeting a specific condition is received from the user terminal 120, the controller 330 may select tasks meeting the corresponding specific condition and provide a list of the tasks and detailed information of each of the tasks to the user terminal 120.

In particular, according to an embodiment of the present disclosure, a task inquiry request signal may be input through a task map. That is, when the task inquiry request signal is input through a specific region within the task map in the user terminal 120, the task map providing apparatus 110 may send a content of the task inquiry request signal to the controller 330.

When a task inquiry request signal to request detailed information of one or more tasks is input through a task map from the user terminal, the task map provider 340 may send, to the controller 330, a user signal regarding a request for the detailed information and information regarding a task of which detailed information is requested to be inquired. In addition, the controller 330 may provide detailed information of a task corresponding to the task inquiry request signal to the user terminal 120. The detailed information of the task may include one or more of: a task performer, a recorded content of a note, an attached file, a note recording due date, a start date of the task, and a due date of the task.

For example, when a task inquiry request signal is input through a region within a task map where one of department names aligned on the first axis is displayed, the task map provider may send a corresponding department name as a search condition to the controller 330. Then, the controller 330 may select and align tasks corresponding to the corresponding department name, that is, tasks to be dealt with by a department having the corresponding department name or tasks assigned to a task performer in the corresponding department. The controller 330 may provide a list of such tasks or information on the corresponding tasks to the user terminal 120. Then, the user terminal 120 may display, on the display, the provided list of the tasks or detailed information of the corresponding tasks.

Alternatively, for example, when a task inquiry request signal is input in response to a user touch or the like being input through a region where one of task classification information on the second axis in the task map is displayed, the task map provider 340 may transmit a content of the corresponding task classification information to the controller 330 and the controller 330 may search for and selectively align tasks corresponding to the corresponding task classification information and provide the tasks to the user terminal 120. For example, if a user inputs a signal by selecting a region of "meeting minutes" among task classification information on the second axis, the user's input is recognized as a task inquiry request signal to request an inquiry of all tasks corresponding to "meeting minutes." When the task map provider recognizes that the task inquiry request signal regarding "meeting minutes" is input, the controller 330 may search for all the tasks which corresponds to "meeting minutes" and which the user has the authority to access, and provide a list of the tasks and/or detailed information of the tasks to the user information.

If a task inquiry request signal is input through a task cell positioned at intersection between one of first alignment references and one of second alignment references, the task inquiry request signal may be recognized as a task inquiry request signal to request an inquiry corresponding to both the corresponding first alignment reference and the corresponding second alignment reference. For example, when a task inquiry request signal is input through a region where a task cell positioned at intersection between a specific department name and specific task classification information is displayed, the controller 330 may selectively align tasks corresponding to both the corresponding department name and the corresponding task classification information and provide the tasks to the user terminal 120. Then, the user terminal 120 may display a list, a content, detailed information, and the like of the selected tasks.

For example, if a user clicks or touches a task cell positioned at intersection between department name "marketing team" and task classification information "meeting minutes" on a task map displayed in the user terminal 120, the user may be allowed to inquire tasks corresponding to meeting minutes drafted by the marketing team.

The controller 330 or the task map provider 340 may count the number of progressive bars present in a task map. In particular, when a task map is provided by the task map provider 340, the controller 330 may count the number of tasks or the number of progressive bars according to alignment references of the tasks.

Alternatively, the controller 330 may count the number of progressive bars depending on each status of the progressive bars. In this case, the task map provider 340 may generate a task map by aligning tasks according to status of the progressive bars.

A numeric value indicating the number of counted progressive bars may be displayed together with task alignment references to which the counted progressive bar belong. In the case where progressive bars are displayed in different colors according to statuses of the progressive bars, a numeric value indicating the number of progressive bars counted depending on each status may be displayed in the same color as color of the corresponding progressive bars. If a progressive bar in the "normal" status is displayed in blue and there are five progressive bars in the normal status, the numeric value "5" may be displayed in blue.

Meanwhile, in the case where a note for a task is to be periodically recorded in a preset note recording period, a note recording reminder may be managed by an additional reminder manager (not shown). In response to transmission of a reminder by the reminder manager, progressive bars and task cells on a task map may be updated in real time.

When arrival of a note recording due date of a note recording period is impending while a periodic note has not yet been input from a terminal of a task performer although a reminder deferring time has elapsed, the reminder manager may generate a note recording reminder and send the note recording reminder to the terminal of the task performer.

If a note is recorded even after a preset reminder deferring time elapses, the controller 330 may instruct the reminder manager to generate a note recording reminder and the reminder manager may transmit the note recording reminder to terminals of one or more task performers. In addition, if a periodic note is not input despite the transmission of the note recording reminder, the reminder manager may repeatedly transmit the note recording reminder again.

While arrival of a note recording due date of a note recording period is impending, when a periodic note has been recorded through a terminal of a task performer before a preset reminder deferring time elapses, a note recording due date until next note recording may be updated and the reminder deferring time may be counted again.

Here, the case where the note recording period, the note recording due date, and the reminder deferring time are updated, the periodic note is input, and the note recording reminder is sent corresponds to the case where a task is in a "proceeding" stage. When a task is terminated or completed and thus the task is no longer in the "proceeding" stage, the reminder note recording due date may not be updated, the reminder deferring time may not be counted, and the reminder manager may not generate or send the note recording reminder. After the task is terminated, the note recording period may not be updated accordingly the periodic note is not necessarily to be input any longer.

According to an embodiment, the reminder deferring time may be set relatively shorter than the note recording period. In this case, the task map providing apparatus 110 may provide the note recording reminder to a terminal of a task performer a few days before a note recording due date. As such, the task map providing apparatus 110 may remind the task performer of that the arrival of the note recording due date is imminent.

According to another embodiment, the reminder deferring time may be set equal to the note recording period. In this case, if a periodic note is not input until the arrival of the note recording due date, the task map providing apparatus 110 may inform the task performer of the fact.

According to yet another embodiment, the reminder deferring time may be set longer than the note recording period. The task map providing apparatus 110 may inform a user of that the note recording due date has already arrived and a periodic note has not been input. In this case, the note recording reminder is not sent to the terminal of the task performer if the task performer inputs the periodic note until the arrival of the note recording due date.

For example, if a task is scheduled to start on Jan. 1, 2019, and to finish on Jan. 31, 2019, a description will be provided in the assumption that a note recording period is set to two weeks and that a reminder deferring time regarding a periodic note.

First, the corresponding task may remain in a "scheduled" stage until Dec. 31, 2018, and change to a "proceeding" stage from Jan. 1, 2019. The note recording period may be counted from Jan. 1, 2019. A note period progressive bar for the corresponding note recording period may be generated, and the progressive bar may be displayed through the user terminal having the authority to access the corresponding task.

A note recording due date for the first periodic note may be January 14. If the first periodic note is not input to the task map providing apparatus 110 or the task map providing system 100 through the terminal of the task performer until January 10, a note recording reminder may be transmitted to the terminal of the task performer on January 10.

The progressive bar may be set to a "normal" status from Jan. 1, 2019, to Jan. 9, 2019. If a periodic note is not input until Jan. 10, 2019, and a note recording reminder is set, the progressive bar may change to an "impending" status from Jan. 10, 2019.

If a periodic note is not input even after January 11, despite transmission of the note recording reminder, the reminder manager may repeatedly retransmit the note recording reminder. In this case, the note recording reminder may be repeatedly transmitted until the periodic note is input.

If the periodic note is input on a date for example, on January 12, before the note recording due date January 14, the note recording reminder for the corresponding note recording period may not be generated any longer. Then, the corresponding note recording period may be terminated, and a second note recording period, that is, a new note recording period, may be initiated starting from January 13. In this case, a period start date may be updated to January 13 to correspond to the new note recording period, and the note recording due date may be reset to January 27. The reminder deferring time may be reset to last until January 23. The progressive bar may be also updated to the "normal" state again.

Alternatively, according to a setting, although the periodic note is recorded before the note recording due date January 14, the corresponding [period may be not closed but maintained, and the second period may be initiated on January 15, as scheduled. Whether to terminate the note recording period earlier than scheduled may depend on a default setting of the task map providing apparatus 110 or a setting by an authorized user (e.g., a task constructor or a task instructor).

If the periodic note is not input until Jan. 14, 2019, the corresponding progressive bar may change to a "suspended" status. Since the periodic note is not input, the note recording reminder may be retransmitted repeatedly. In this case, an interval of repeated transmission of the note recording reminder may be set by the task instructor or the task constructor. In addition, the number of repeated transmission of the note recording reminder in the "impending" and/or "suspended" status may be counted by the controller 330 or the reminder manager, and the number of repeated retransmission of the note recording reminder may be stored in detailed information of the corresponding task.

There will be described the case where a periodic note is input after the note recording due date of January 4, that is, when the progressive bar is in the "suspended" status. For example, when a periodic note corresponding to the first note recording period is input on January 16, the first note recording period may be terminated on January 16 when the periodic note is input, and the second note recording period may be initiated on January 17. Accordingly, the start date of the second note recording period may be scheduled to be January 17, a note recording due date of the second note recording period may be scheduled to be January 31, and the due date of the second note recording period may be scheduled to be January 31. Of course, these dates may change depending on when the second periodic note is input. In addition, the date when a note recording reminder of the second note recording period is transmitted may be January 27, which comes after a reminder deferring time of ten days passes from January 17.

Alternatively, according to another embodiment of the present disclosure, when a periodic note corresponding to the first note recording period is input on January 16, the second note recording period may be initiated on January 15, as scheduled, and the first note recording period may not be closed but maintained in the "suspended" status. In this case, the start date of the second note recording period may be scheduled to be January 16, the period due date of the second note recording period may be scheduled to be January 30, and a note recording reminder for the second periodic note may be scheduled to be sent to the terminal of the task performer on January 26. Even in this case, the period due date and transmission of the note recording reminder may depend on when and whether the second periodic note is actually input.

Figure 4:
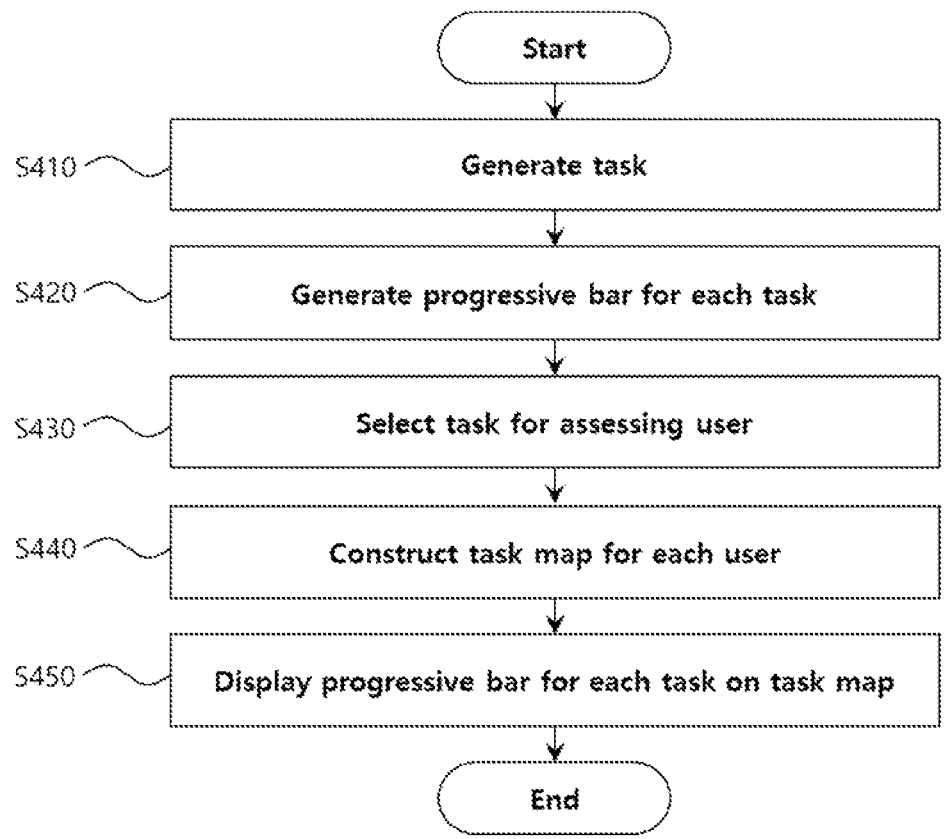
FIG. 4 is a flowchart illustrating a task map providing method according to an embodiment of the present disclosure.

FIG. 4 is a flowchart illustrating a task map providing method according to an embodiment of the present disclosure.

First, in response to a task generating request from a terminal of a task constructor, the task map providing apparatus 110 may generate a task in operation S410. The task map providing apparatus 110 may designate a task instructor and a task performer for the corresponding task and may store detailed information of the corresponding task, which is input when the corresponding task generating request was received The detailed information of the corresponding task, which is input together with the task generating request from the task constructor, may be a name of the task, a classification of the task, schedule of the task including the start date and the end date of the task, task performer information, the task instructor information, and the like. In this case, the detailed information of the corresponding task may be used as basic information necessary to generate the task, may be detailed information provided in response to an inquiry of the task, and may be used as task alignment references to generate a task map later.

Here, one or more tasks may be generated through a chatting room. That is, there is a chatting room where one or more of the task constructor, the task instructor, and the task performer participate, and the task constructor may transmit the task generating request through the chatting room. In this case, the task generating request may be a kind of chatting room message.

When the task generating request is input from the terminal of the terminal constructor through the chatting room, the task map providing apparatus 110 may generate one or more tasks associated with the chatting room. In this case, when an additional path to a corresponding task is provided, users authorized to access the corresponding task may directly access the task or may access the task through the chatting room associated with the corresponding task.

When the task is generated, the task map providing apparatus 110 may generate a progressive bar for the task in operation S420. Performing the task may include repeatedly or periodically recording a note regarding the task. The progressive bar is a widget that visually shows how many days have passed until a due date of recording the note to be recorded regarding the task. The note regarding the task may include reporting, an interim result, a final result, and the like occurring in the course of processing and performing the task.

In particular, when it is required to periodically record such a note, the note may be referred to as a periodic note, as described above. When a note recording period in which the periodic note is to be input is set, it is possible to sequentially set updating of the note recording period, scheduling transmission of a note recording reminder, a reminder deferring time, and the like. Here, when a task is generated through a chatting room, a message or a signal to set the note recording period or the reminder deferring time may be also input through the chatting room.

Next, in response to access by a user terminal, the task map providing apparatus 110 may select tasks matching the authority of the user terminal in operation S430. Using identification information of the user terminal 120 attempting to access the task map providing apparatus 110, the task map providing apparatus 110 may select tasks, which a user of the user terminal 120 is authorized to access, open, modify, and the like, and may open the matching tasks to the user terminal 120.

When tasks suitable for the user are selected, the task map providing apparatus 110 may generate a task map including the selected tasks in operation S440. First alignment references may be set on a first axis of the task map, and second alignment references may be set on a second axis of the task map. Here, for example, a department in charge of a task or a name of a department to which a task performer belongs may be set on the first axis as the first alignment references, and task classification information according to sort and nature of work of the task may be set on the second axis as the second alignment references. The selected tasks may be aligned in the task map according to the first alignment references and the second alignment references.

Here, one or more task cells may be included in the task map, each of the task cells corresponds to the respective tasks, and progressive bars corresponding to the respective tasks may be displayed in the task cells in operation S450. In addition, a note recording period may start, a reminder deferring time may be reset, a note recording reminder may be transmitted, and a progressive bar may be updated accordingly. In particular, when the note recording period is set, progressive bar updating and the like may be repeatedly performed whenever a new note recording period starts.

In this case, when there is a chatting room associated with a task and when a task and a task map are generated through the particular chatting room, the task map providing apparatus 110 may transmit a note recording reminder to the terminal of the task performer through the chatting room. That is, the note recording reminder may be provided to the terminal of the task performer as a kind of chatting room message.

The task map may be also associated with the chatting room or displayed through a screen dependent on the chatting room and may be displayed on a screen independent of the chatting room according to a default setting or a user request.

Figure 5:
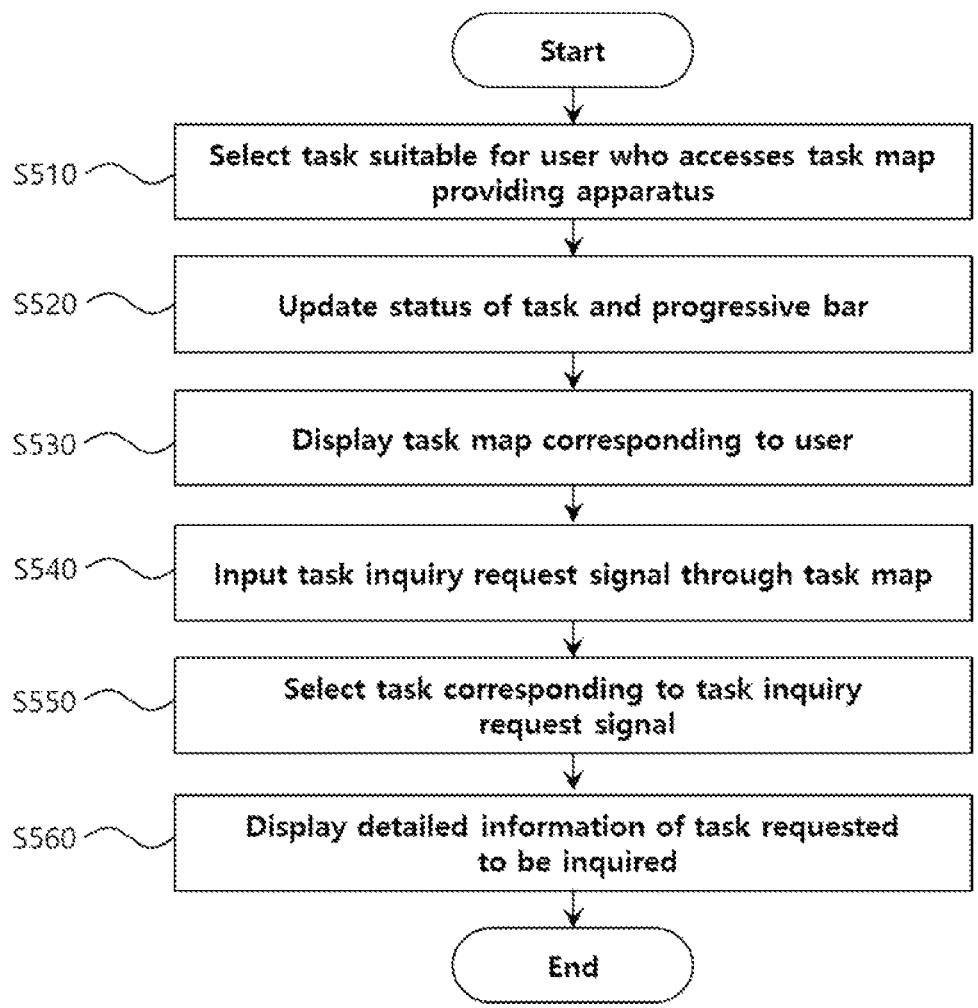
FIG. 5 is a flowchart illustrating a task map providing method according to another embodiment of the present disclosure.

FIG. 5 is a flowchart illustrating a task map providing method according to another embodiment of the present disclosure.

First, in response to access by the user terminal 120, the task map providing apparatus 110 may select a task suitable for the user terminal 120 in operation S510. Then, the task map providing apparatus 110 may update, in real time, stages of the selected tasks, statuses of progressive bars for the respective selective tasks, and the like in operation S520.

The task map providing apparatus 110 may generate a task map corresponding to a user in access and provide the task map to the user terminal 120, and the user terminal 120 may display the task map in operation S530.

Then, the user may be allowed to input a task inquiry request signal through the displayed task map in operation S540. According to a region of the task map in which the task inquiry request signal is input, an inquiry target task may be determined.

That is, when a task inquiry request signal is input by clicking or touching one specific task cell, the task inquiry request signal may be interpreted as a detailed information inquiry request regarding one specific task. In this case, the task map providing apparatus 110 may provide detailed information of the task, which includes a task instructor, a task performer, a content of a note regarding the task, an attached file, schedule of the task, a note recording due date, and the like, in operations 550 and 560.

Alternatively, when a task inquiry request signal is input through a region of the task map in which a specific alignment reference on a first axis or a second axis is displayed, the task inquiry request signal may be interpreted as a signal to request reselection of tasks corresponding to the specific alignment reference, a list of reselected tasks, and/or detailed information of the reselected tasks.

For example, in the case where tasks are aligned according to statuses of progressive bars and a user clicks or touch a portion indicated by "impending" in a task map, the task map providing apparatus may interpret the click or touch as a signal to request an inquiry of a task of which a progressive bar is in the "impending" status. In this case, the task map providing apparatus 110 may reselect only tasks with progressive bars in the "impending" status from among tasks displayed on the task map in operation S550. Then, the task map providing apparatus 110 may provide a list of the reselected tasks and detailed information thereof to the user terminal 120 in operation S560.

Alternatively, progressive bars in the impending status may be counted and a numeric value indicating the number of the counted progressive bars may be displayed in an "impending" field. This is the case even when a user inputs a task inquiry request signal through a region of the task map where the corresponding numeric value is displayed. Even in this case, the task map providing apparatus 110 may select tasks with progressive bars in the "impending" status and provide the selected tasks to the user.

Figure 6:
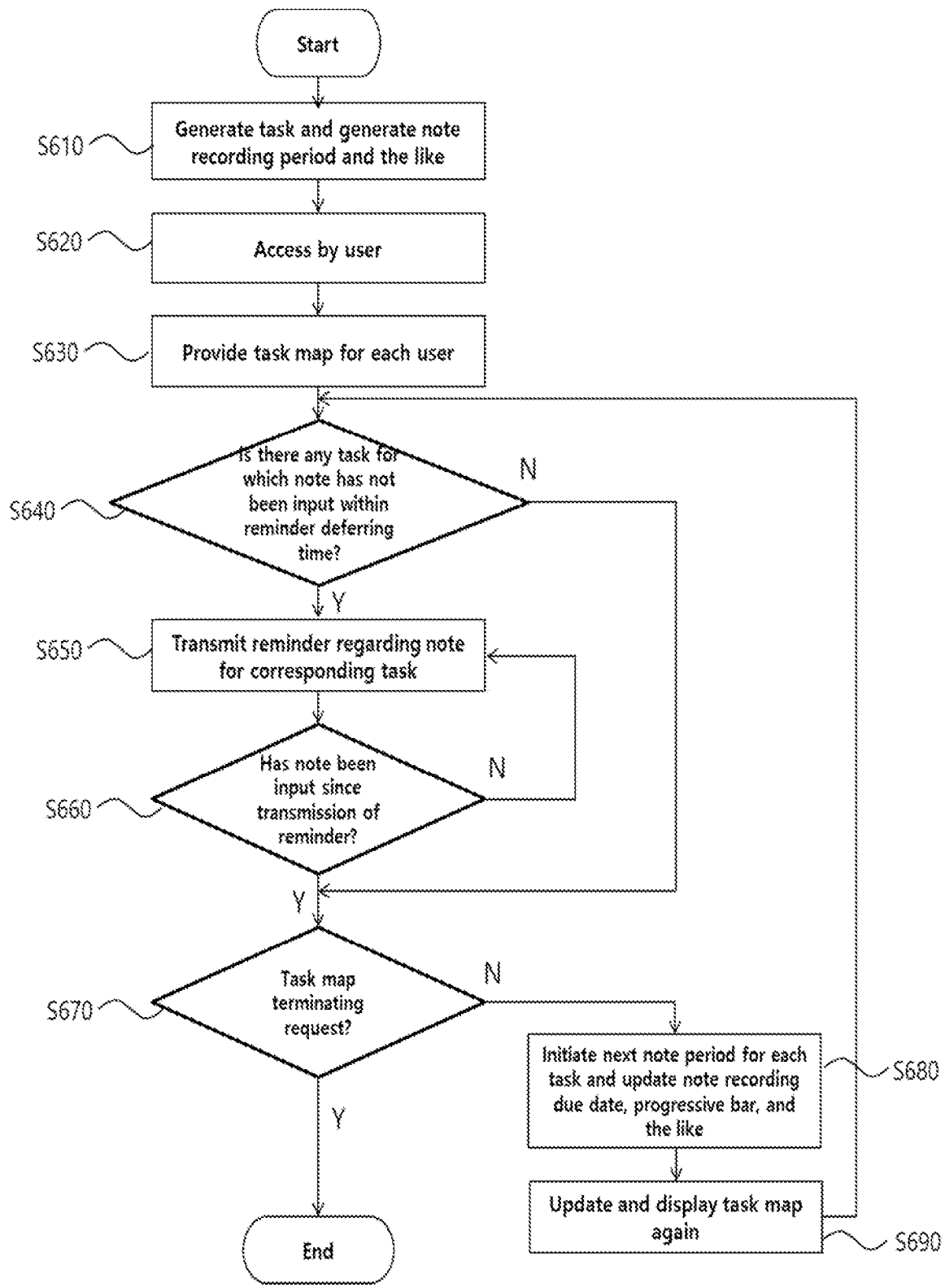
FIG. 6 is a flowchart illustrating a task map providing method according to yet another embodiment of the present disclosure.

FIG. 6 is a flowchart illustrating a task map providing method according to yet another embodiment of the present disclosure.

Referring to FIG. 6, the following description will disclose an exemplary case where a note recording period is set, that is, a case where a periodic note is recorded in a note recording period.

The task map providing apparatus 110 may generate a task and set a note recording period in operation S610. Information on the note recording period may be included in a task generating request and provided to the task map providing apparatus 110. In addition, the task map providing apparatus 110 may set a reminder deferring time according to information included in the task generating request, a user setting, a user input signal, or a default setting of the task map providing apparatus.

In particular, in the case where a task is generated through a chatting room and a note recording period and a note recording reminder are provided, a widget or user interface for task generation, period setting, a task map request, a task inquiry request, and the like may be included in the chatting room.

When a user terminal accesses the task map providing apparatus 110 in operation S620, the task map providing apparatus 110 may recognize the access, verify the authority of a user of the user terminal based on identification information of the user, and reselect tasks. Then, the task map providing apparatus 110 may generate a task map suitable for the user and provide the generated task map in operation S630.

Then, the task map providing apparatus 110 may determine whether a periodic note is input within a reminder deferring time in operation S640. When a periodic note corresponding to a corresponding task is not input within the reminder deferring time, the task map providing apparatus 110 may transmit a note recording reminder in the form of an additional message or may transmit the note recording reminder in the form of a chatting room message if there is a chatting room associated with the corresponding task in operation S650.

When a periodic note is not recorded after the note recording reminder is transmitted in operation S660, the note recording reminder is repeatedly transmitted to a terminal of a task performer in operation S650.

When every note is recorded within the reminder deferring time or when the periodic note is recorded after the note recording reminder is transmitted in operation S640, the note recording reminder is not necessarily transmitted any longer and the task map providing apparatus 110 may determine whether to terminate the corresponding task map in operation S670. When a signal to request termination of the task map is input, the task map providing apparatus 110 may terminate a task map providing process.

When the signal to request termination of the task map is not input, the task map providing apparatus 110 may update a note recording period, a note recording due date, a progressive bar, a task cell, and the like to record a next periodic note regarding each individual task in operation S680. When there is an object to update, the task map providing apparatus 110 may update the task map and provide the updated task map to the user terminal 120 in operation S690.

The task map providing apparatus 110 may determine again whether a periodic note is input within a reminder deferring time corresponding to a new note recording period in operation S640 and may thereafter repeatedly perform the same processes regarding determining whether a reminder is sent or whether a periodic note is input, updating a progressive bar and a task cell, and the like.

Figure 7:
FIG. 7 is a diagram illustrating an example in which a progressive bar and a task cell are updated in response to recording of a periodic note according to an embodiment of the present disclosure.
Figure 7:
Figure 7:

FIG. 7 is a diagram illustrating an example in which a progressive bar 715 and a task cell 710 are updated in response to recording of a periodic note according to an embodiment of the present disclosure.

The embodiment described with reference to FIG. 7 shows that the current note recording round is the fifth round and that progressive bars and task cell respectively corresponding to a periodic note of the sixth round are displayed differently in response to inputting of a periodic note of the fifth round.

The example (a) in FIG. 7 shows the task cell 710 and the progressive bar 715 in the case where a reminder deferring time has not yet elapsed when it comes to a task of which a note recording period is in the fifth round. The note period progressive bar 715 is still in the "normal" status.

The example (b) in FIG. 7 shows a task cell 720 and a progressive bar 725 in the case where a reminder deferring time has elapsed when it comes to a task of which a note recording period is in the fifth round. Since a note has not yet been input although the reminder deferring time has elapsed, a note recording reminder has been already sent to a terminal of a task performer and the progressive bar 725 has changed to the "impending" status, and thus, for example, a displaying manner, such as color, of the progressive bar 725 have changed compared to the progressive bar 715 in the normal status, which is shown in the example (a) in FIG. 7. In addition, since the note recording reminder has been sent, the progressive bar may change in status and the corresponding task cell 720 may also change in the displaying manner such as color, brightness, size, contrast, highlight, or the like.

The example (c) in FIG. 7 shows a task cell 730 and a note period progressive bar 735 after a periodic note for the fifth round has been input. Referring to the example (c) in FIG. 7, a note recording period of a next round (the sixth round) starts in response to inputting of a periodic note of a previous round (the fifth found), and the status of the progressive bar 735 of the sixth round has changed back to "normal."

Figure 8:
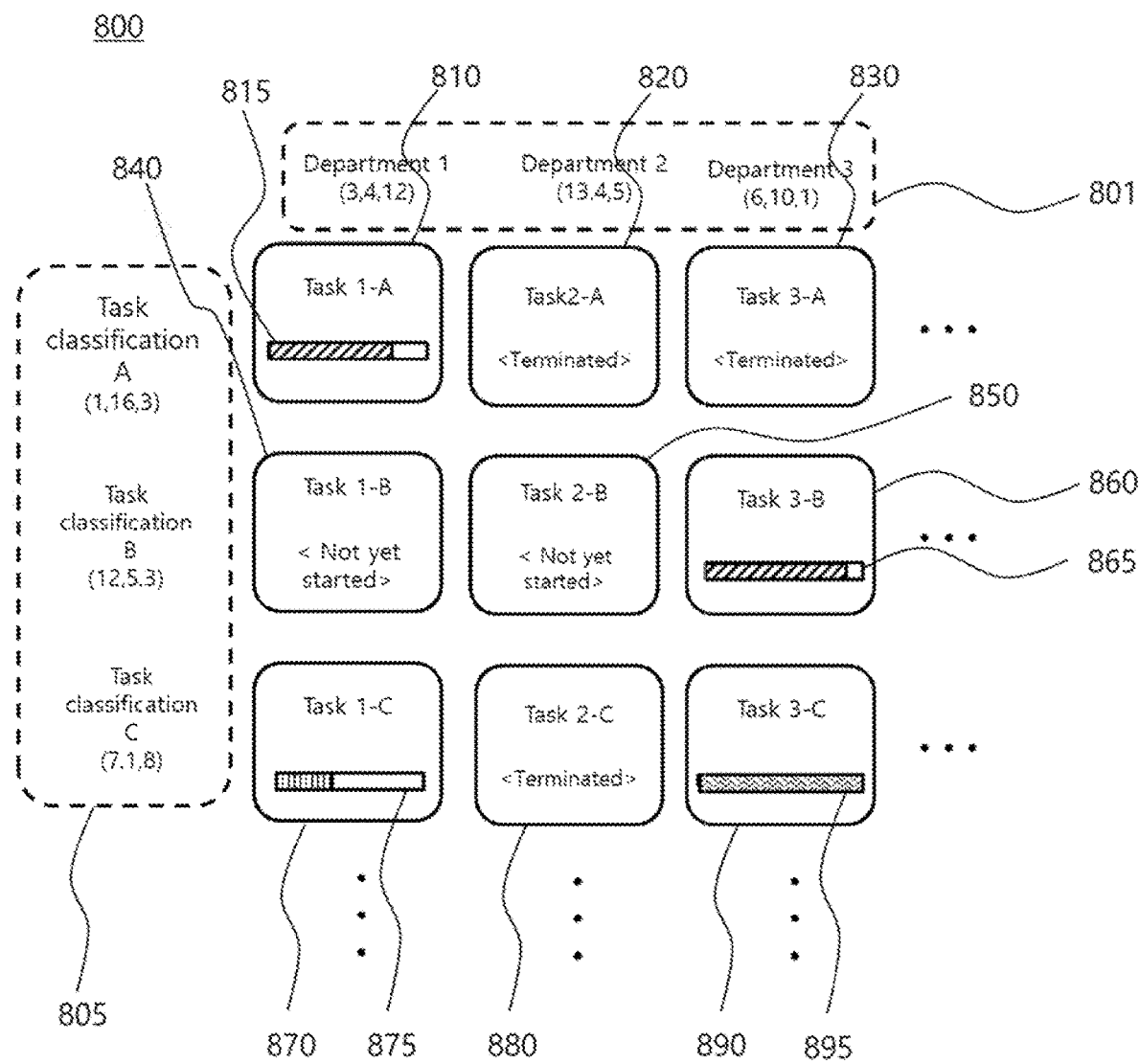
FIGS. 8 and 9 are diagrams illustrating examples of a screen where a task map generated by a task map providing apparatus according to an embodiment of the present disclosure is displayed.

FIG. 8 is a diagram illustrating an example of a portion of a screen where a task map 800 generated by a task map providing apparatus according to an embodiment of the present disclosure is displayed.

A task map 800 includes a plurality of task cells 810, 820, . . . , 880, and 980. According to an embodiment shown in FIG. 8, the task map 800 includes tasks aligned according to first alignment references 801 and second alignment references 805. The first alignment references 801 may be positioned on the horizontal axis and may be names of departments to which task performers belong or which are responsible for the tasks. Hence, the tasks may be aligned based on task performer information or task performing department information according to the first alignment references.

The second alignment references 805 may be positioned on the vertical axis and may be task classification information according to nature and sort of the tasks.

The task map 800 shown in FIG. 8 includes a task cell 810 for a task 1-A, a task cell 820 for a task 2-A, a task cell 830 for a task 3-A, a task cell 840 for a task 1-B, a task cell 850 for a task 2-B, a task cell 860 for a task 3-B, a task cell 870 for a task 1-C, a task cell 880 for a task 2-C, and a task cell 890 for a task 3-C.

One or more tasks may correspond to the first alignment references and the second alignment references. In this case, a plurality of tasks may correspond to a single task cell in the task map, and a plurality of task cells for each task may be displayed at one position in an overlapping manner. That is, there are two or more tasks corresponding to both a first alignment reference a and a second alignment reference b, the two or more tasks may correspond to the task cell 860 for the task 3-B or two or more task calls may be displayed in an overlapping manner.

The task cell 860 for the task 3-B in FIG. 8 shows the case where two or more tasks are generated for work B. In this case, two or more progressive bars may be displayed in an overlapping manner such that a progressive bar in an overdue or impending status is displayed above a progressive bar in a normal status.

A progressive bar 815 for the task 1-A may be displayed in the task cell 810 for the task 1-A, a progressive bar 865 for the task 3-B may be displayed in the task cell 860 for the task cell 3-B, a progressive bar 875 for the task 1-C may be displayed in the task cell 870 for the task 1-C, and a progressive bar 895 for the task 3-C may be displayed in the task cell 890 for the task 3-C.

The progressive bar 815 for the task 1-A and the progressive bar 865 for the task 3-B may be in the impending status. The progressive bar 875 for the task 1-C may be in the normal status. The progressive bar 895 for the task 3-C may be in the overdue status. Progressive bars in the normal status, the impending status, and the overdue status may be set with displaying manners, such as different color, texture, brightness, or the like.

The task 1-A, the task 3-B, the task 1-C, and the task 3-C may be in the ongoing stage. The task 2-A, the task 3-A, and the task 2-C are in the terminated stage. The task 1-B and the task 2-B are in the scheduled stage. Progressive bars only for the tasks in the ongoing stages may be displayed in the corresponding task cells.

In regions where the first alignment references and the second alignment references are displayed, the number of tasks for each status of the progressive bars may be displayed while sorted by the first alignment references and the second alignment references.

For example, in the region where the first alignment references 801 are displayed, tasks corresponding to Department 1 may include three tasks with progressive bars in the normal status, four tasks with progressive bars in the impending status, and twelve tasks with progressive bars in the overdue status. Likewise, tasks corresponding to Department 2 may include thirteen tasks with progressive bars in the normal status, four tasks with progressive bars in the impending status, and tasks with progressive bars in the overdue status.

In addition, in the region where the second alignment references 805 are displayed, tasks corresponding to task classification A may include one task with a progressive bar in the normal status, sixteen tasks with progressive bars in the impending status, and three tasks with progressive bars in the overdue status. Likewise, tasks corresponding to task classification B may include twelve tasks with progressive bars in the normal status, five tasks with progressive bars in the impending status, and three tasks with progressive bar in the overdue status.

As such, through the task map 800, it is possible for a user to easily and intuitively figure out the entire work progress regarding which department is overloaded with note recording jobs among the entire tasks, which department is performing tasks fast, which type of task is delayed, and the like.

In addition, it is possible to set a priority based on a degree of emergency among the entire tasks. According to another embodiment, the priority may be one of the first alignment references or the second alignment references. In this case, it is possible to immediately enter a detailed screen regarding the highest priority task or the most emergent task through the task map 800. In doing so, it is possible to access a screen to open detailed information of the corresponding task, open a periodic note, and record a periodic note.

Figure 9:
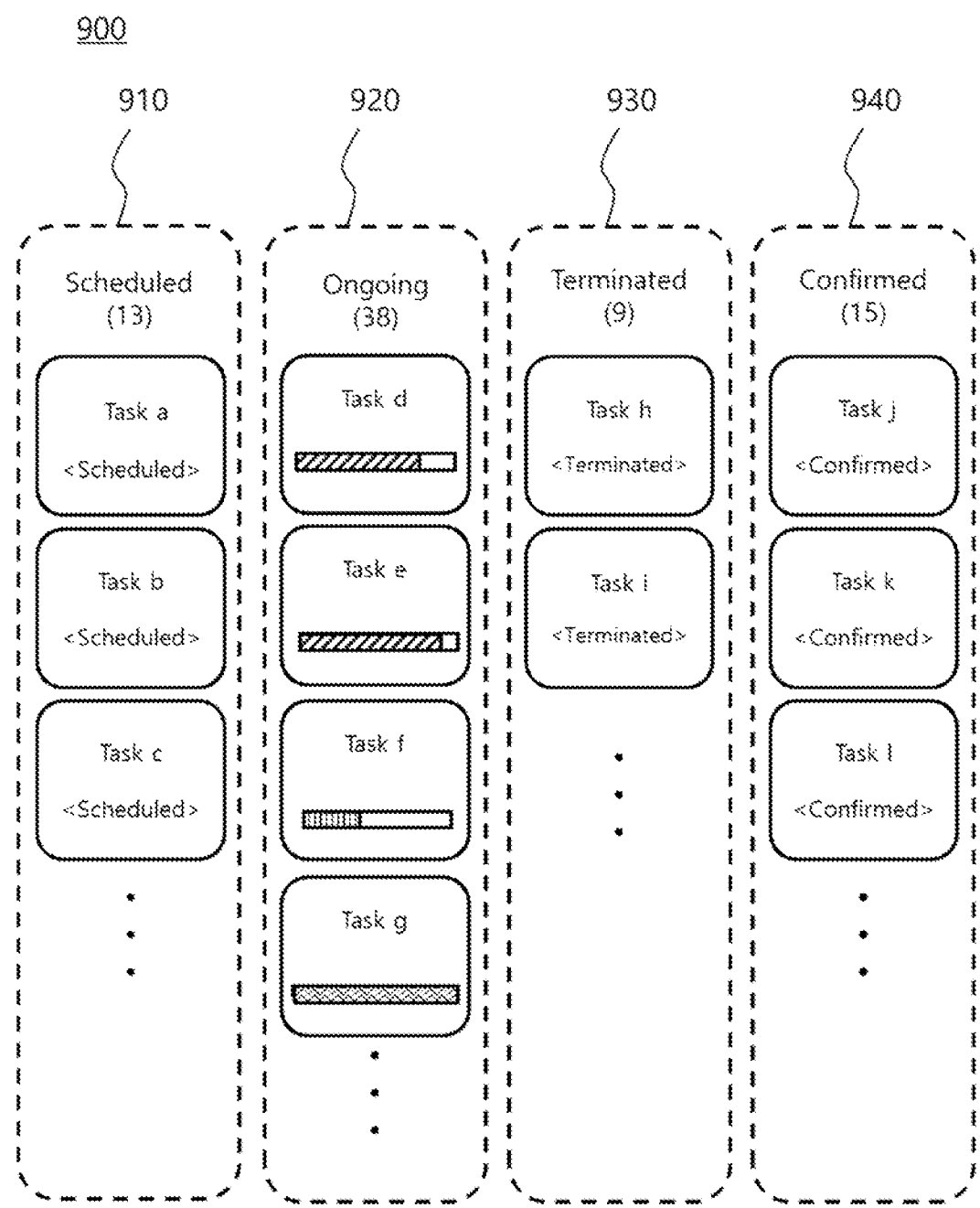

FIG. 9 is a diagram illustrating a task map 900 in which tasks are aligned by stages thereof according to another embodiment of the present disclosure.

In the task map 900 shown in FIG. 9, the respective tasks are aligned and classified by four stages. In this case, first alignment references may be set in the task map 900, and the first alignment references may be task stages.

The task map 900 shown in FIG. 9 may include a task group 910 in the scheduled stage, a task group 920 in the ongoing stage, a task group 930 in the terminated stage, and a task group 940 in the confirmed stage. In each task group, task cells of the cells for tasks corresponding to the respective stages are displayed.

That is, the task group 910 in the scheduled stage may include task cells corresponding to task a, task b, task c, and the like. The task group 920 in the ongoing stage may include task cells corresponding to task d, task 3, task f, task g, and the like. The task group 930 in the terminated stage may include a task h, a task i, and the like. The task group 940 in the confirmed stage may include task cells corresponding to task j, task k, task l, and the like. In addition, progressive bars corresponding to tasks may be displayed only in the task cells belonging to the task group 920 in the ongoing stage.

Of course, there may be provided a task map in which tasks in the ongoing stage are aligned based on statuses of progressive bars according to the same principle.

Figure 10:
FIG. 10 is a diagram illustrating an example of a screen in which detailed information of a task corresponding to a task inquiry request signal is displayed according to an embodiment of the present disclosure.

FIG. 10 is a diagram illustrating an example of a screen in which detailed information and a progressive bar 1005 of a task is displayed in a specific task cell 1000 within a task map according to an embodiment of the present disclosure.

According to an embodiment of the present disclosure, the task map providing apparatus 110 may generate a task map composed of one or more tasks. In particular, since each user is authorized to access different tasks, it is possible to select tasks that a corresponding user is authorized to access or open and to generate a task map in which the selected tasks are aligned according to predetermined references. The generated task map may be displayed through a display of the user terminal 120.

As described above, the task map includes one or more tasks. Thus, the task map may include the task cell 1000 corresponding to each individual task. FIG. 10 illustrates an example of the task cell 1000 within the task map. In particular, FIG. 10 illustrates an example of a screen in the case where a task inquiry request signal is input and detailed information of a task corresponding to the task inquiry request signal is provided through the task cell 1000.

In the task cell 1000 for the task corresponding to the task inquiry request signal, detailed information or brief information of the task may be displayed. In an embodiment described with reference to FIG. 10, it may be assumed that the detailed information of the task is displayed in the task cell 1000. In the case where a name of the task (task name) and a note recording period of the task is set, the task cell 1000 may include round information of the current note recording period information on the note recording period, information on a note recording due date of the current round, the number of notes which have been accumulated and recorded, information on a recorded date of the most recently recorded periodic note, information on a content of the most recently recorded periodic note, and the like. In addition, a progressive bar 1005 may be displayed together in the task cell 1000. In addition, the progressive bar 1005 may represent the current status thereof, that is, how impending the note recording due date is, through color or the like of the progressive bar 1005.

Of course, displaying the detailed information of the task in the task cell 100, as shown in FIG. 10, may be possible when a user inputs a task inquiry request signal to request the detailed information of the task or calls a screen to open the detailed information. In a screen where the entire task map is displayed, rather than a screen for details of the task, other detailed information may be partially or entirely omitted in each task cell 810 (see FIG. 8), as shown in FIG. 8, and the progressive bar 1005 may be displayed alone.

As described above, the progressive bar 1005 may be displayed based on a displaying manner, such as color, that is preset according to a status thereof. Through the note period progressive bar 1005 displayed in the task cell 1000, a task performer or a task instructor may intuitively figure out how much a note recording period of the current round has passed and how many days remain until a note recording due date.

The disclosed technology may have the following effects. However, it does not mean that a particular exemplary embodiment includes all or only the following effects. Therefore, it should not be understood that the scope of the present disclosure is not limited to the following.

According to an embodiment of the present disclosure, if there is a note to be written repeatedly with respect to one task, it is possible to provide a reminder to a task performer when or before a due date of recording the note arrives, thereby performing the task, as planned. In addition, it is possible to visualize recording of a note in the form of a progressive bar, thereby allowing a user to intuitively figure out work progress. In addition, as a stage of the task or a status of the progressive bar change in real time depending on whether the due date arrives, it is possible to allow the user to easily figure out which task is urgent. In addition, with respect to a more number of subordinate tasks for multiple tasks, it is possible to provide a user interface which visualizes work progress in real time, thereby allowing the user to conveniently figure out work progress.

Although the present disclosure has been described with reference to the exemplary embodiment of the present disclosure, those of ordinary skill in the art should understand that the present disclosure may be modified and changed in various ways within a scope that does not depart from the spirit and area of the present disclosure described in the claims below.

What is claimed is:

1. A task map providing apparatus for displaying one or more tasks, the apparatus comprising:
a memory; and
a processor electrically connected with the memory, wherein
the processor is configured to:
generate the one or more tasks by receiving, from a task instructor who instructs recording a note through the one or more tasks, information on a task performer instructed to record the note corresponding to the one or more tasks;
generate progressive bars to correspond the one or more tasks, the progressive bars each representing how many days have passed and remain with respect to a note recording due date by which the task performer needs to record the note; and
when an access by a user terminal is detected, generate a task map including the one or more tasks, that the user terminal has authority to access,
the task map comprises one or more task cells corresponding to the one or more tasks, respectively, and the progressive bars corresponding to the one or more tasks are displayed in the respective task cells in the task map,
the progressive bars are provided in a different display manner according to how many days have passed or whether a note recording reminder has been sent,
the processor is further configured to:
initiate display of the task map on a plane including a first axis and a second axis;
initiate display of the one or more tasks on the task map;
align the one or more tasks on at least one of the first axis according to first alignment references or the second axis according to second alignment references; and
arrange the progressive bars corresponding to the one or more tasks in the task map, and
the processor is further configured to
select, based on a task inquiry request signal being input from the user terminal through a specific region within the task map in the user terminal, detailed information regarding the one or more tasks corresponding to one of the first alignment references and one of the second alignment references located at the specific region, and
initiate display of the tasks corresponding to one of the first alignment references and one of the second alignment references located at the specific region.

2. The task map providing apparatus of claim 1, wherein the note is periodically input from a terminal of the task performer in a preset period, and
the processor is further configured to, in response to completed recording of the note, update the note recording due date, by which the note is to be recorded in a next time, and the progressive bars to correspond to the preset period.

3. The task map providing apparatus of claim 2, wherein the processor is further configured to:
set a reminder deferring time to temporarily defer transmission of a note recording reminder that notifies arrival of the note recording due date; and when the arrival of the note recording due date is impending while the note has not yet been recorded by the terminal of the task performer although the reminder deferring time has elapsed, transmit the note recording reminder to the terminal of the task performer.

4. The task map providing apparatus of claim 3, wherein the processor is further configured to repeatedly transmit the note recording reminder until recording the note is completed after the reminder deferring time elapses.

5. The task map providing apparatus of claim 1, wherein the processor is further configured to:
receive, from the task instructor, one or more information from among a task name of the one or more tasks, a department name of the task performer, and classification information of the one or more tasks according to an instruction indicated through the one or more tasks; and
store the received information.

6. The task map providing apparatus of claim 5, wherein the processor is further configured to:
align the progressive bars on the first axis according to the department names and on the second axis according to the classification information.

7. The task map providing apparatus of claim 6, wherein the processor is further configured to:
receive, from the user terminal, a task inquiry request signal to request an inquiry of the one or more tasks;
when the task inquiry request signal is input through a region of the task map where one of the department names on the first axis is displayed, selectively align and initiate display of the one or more tasks corresponding to the department names; and
when the task inquiry request signal is input through a region of the task map where one of the classification information on the second axis is displayed, selectively align and initiate display of the one or more tasks corresponding to the classification information.

8. The task map providing apparatus of claim 6, wherein the processor is further configured to, when a task inquiry request signal is input through a region positioned at intersection where one of the department names and one of the classification information, selectively align and initiate display of the one or more tasks corresponding to both the department name and the classification information.

9. The task map providing apparatus of claim 3, wherein the progressive bars are classified into a normal status within the reminder deferring time after recording the note is instructed, an impending status until the note recording due date after the reminder deferring time elapses, and an overdue status after the note recording due date.

10. The task map providing apparatus of claim 9, wherein the note is periodically input from the terminal of the task performer in a preset period, and
the processor is further configured to, in response to completed recording of the note, update the note recording due date, by which for the note is to be recorded in a next time, and the progressive bars and initiate the updated progressive bars in the normal status again.

11. The task map providing apparatus of claim 9, wherein the processor is further configured to initiate display of the progressive bars in the respective task cells on the task map using a different color according to the normal status, the impending status, or the overdue status.

12. The task map providing apparatus of claim 11, wherein
the processor is further configured to count a number of the progressive bars,
the progressive bars are counted according to statuses thereof, and
a numeric value indicating a number of the counted progressive bars is displayed in color identical to color of the counted progressive bars.

13. The task map providing apparatus of claim 3, wherein the processor is further configured to, when color for the task cells corresponding to the respective one or more tasks on the task map is displayed, initiate display of the task cells in a different color before and after the note recording reminder is transmitted.

14. The task map providing apparatus of claim 1, wherein
stages of the one or more tasks are classified into a scheduled stage before a starting date of a corresponding task, an ongoing stage between the start date and an end date of the corresponding task, a terminated stage after the end date of the corresponding task, and a confirmed stage after the task instructor confirms a processed result of the one or more tasks, and
the processor is further configured to, when the one or more tasks is in the ongoing stage, initiate display of the progressive bars on the task map.

15. The task map providing apparatus of claim 1, wherein the detailed information regarding the one or more tasks include detailed information of one or more of: the task performer of the task, a recorded content of the note, the note recording due date, and task schedule information including either or both of a start date and a due date of the task.

16. The task map providing apparatus of claim 1, wherein the processor is further configured to:
align the one or more tasks on the first axis according to the first alignment references and the second axis according to the second alignment references.

17. A non-transitory computer-readable medium having embodied thereon a program, which when executed by a computer causes the computer to execute a task map providing method, the method comprising:
generating one or more tasks by receiving, from a task instructor who instructs to record notes through the one or more tasks, information regarding a task performer instructed to record the notes for the one or more tasks;
generating progressive bars to correspond to the respective one or more tasks, the progressive bars each representing how many days have passed and remain with respect to a note recording due date, by which the task performer needs to record the notes;
when an access by a user terminal is detected, generating a task map including the one or more tasks and one or more task cells corresponding to the respective one or more tasks, the one or more task tasks which the user terminal has authority to access, wherein
the task map comprises the one or more task cells corresponding to the one or more tasks, respectively, and the progressive bars corresponding to the one or more tasks are displayed in the respective task cells in the task map, and
the progressive bars are provided in a different display manner according to how many days have passed or whether a note recording reminder has been sent;
displaying of the task map on a plane including a first axis and a second axis;

displaying of the one or more tasks on the task map;
aligning the one or more tasks on at least one of the first axis according to first alignment references or the second axis according to second alignment references;
arranging the progressive bars corresponding to the one or more tasks in the task map;
selecting, based on a task inquiry request signal being input from the user terminal through a specific region within the task map in the user terminal, detailed information regarding the one or more tasks corresponding to one of the first alignment references and one of the second alignment references located at the specific region; and
displaying the tasks corresponding to one of the first alignment references and one of the second alignment references located at the specific region.

* * * * *